UNITED STATES PATENT OFFICE.

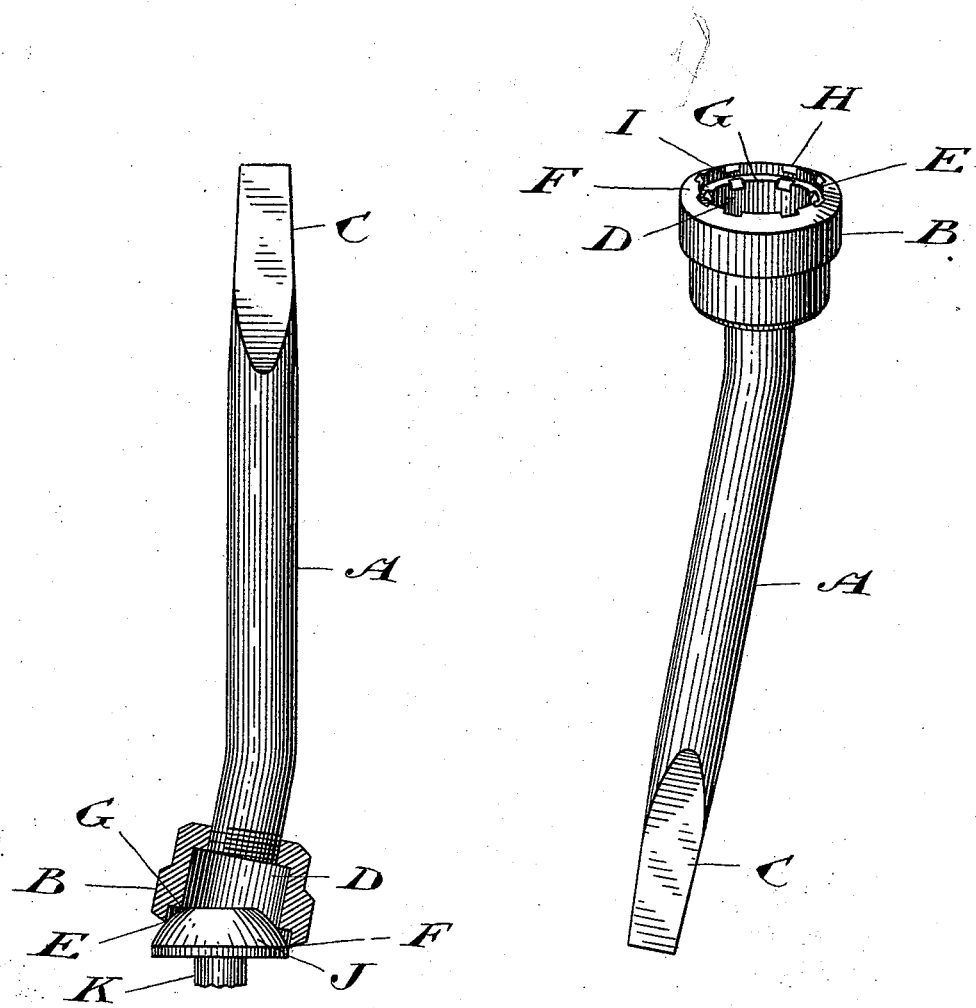

TRONSON DRAPER, OF PETROLIA, CANADA.

VALVE-FACING TOOL.

SPECIFICATION forming part of Letters Patent No. 530,167, dated December 4, 1894.

Application filed March 19, 1894. Serial No. 504,268. (No model.)

*To all whom it may concern:*

Be it known that I, TRONSON DRAPER, of the town of Petrolia, in the county of Lambton and Province of Ontario, Canada, have invented certain new and useful Improvements in Valve-Facing Tools, of which the following is a specification.

The object of the invention is to provide an improved tool for forming or refacing globe valve-disks, and it consists, essentially, of a rotary cup cutter having its face set diagonally to the axis of rotation of the tool and having a shank which is adapted for connection with a hand brace or other means of driving it, so as to give a sweeping or swirling motion to two annular cutting edges formed or stepped in said cup, one within the other, the annular cutting edge nearest to the bent shank being formed on a circle of less diameter than that on which the outer cutting edge is formed, the said cutting edges being so located with respect to each other as to give the required convexity to the face of the valve in order to enable it to fit its seat, as hereinafter described.

In carrying out my invention, I have found it convenient to make it in two parts, viz: a bent shank and a cup-shaped cutter, as shown in the accompanying drawings, in which—

Figure 1, is a perspective view of my valve-facing tool. Fig. 2, is a sectional elevation of the same.

Like letters of reference indicate similar parts in the different figures.

In Fig. 1—A, is a bent shank screwed on or otherwise attached to the steel cup B. The end of this bent shank is squared at C, for attachment to a hand brace, or other means of giving it a rotary motion.

It is obvious that the shape of the shank need not be of the exact form shown, but it is essential that the face of the cutting tool shall be set diagonally to the axis of motion of the tool, so that when it is revolved it will have a wabbling or swirling motion over the face of the valve.

D, is the hollowed or central portion of the cup B, and E, is the outer annular cutting edge formed on the beveled end F, of the steel cup B. Within the cup, formed in a step below, is the inner annular cutting edge G, formed on a circle of less diameter than that on which the outer annular cutting edge E, is formed. These annular cutting edges are so located with respect to each other as to give the required convexity to the face of the valve in order that it may fit its seat.

My improved valve-facing tool is used in connection with a toothed seat-reamer of ordinary construction, which may be used in forming the seat of the valve, the annular cutting edges in the steel cup B, being of such diameter and so located with respect to each other as to suit the seat-reaming tool employed in forming the seat of the valve, and for this purpose the steel cups for attachment to the bent shank may be of various sizes and patterns. The annular cutting edges E, and G, may be partly cut away so as to form recesses H, and I, on the cutting edges, thus giving less bearing and a preferable form of cutting edge, as shown in Fig. 1.

In Fig. 2—the facing-tool is shown in the operation of forming or refacing a convex valve-disk J, attached to its stem K, which is held rigidly in position during the process of forming or refacing the valve-disk, the squared end of the bent shank A, being fitted into the end of a brace or other means which may give the required rotary motion. The face of the tool being set diagonally to the axis of motion caused by the shank A, being bent as shown, when it is caused to revolve, the steel cup B, maintains a rocking or swirling motion, and the inner and outer annular cutting edges E, and G, formed in the steel cup B, partake of this motion, and are caused to traverse the surface of the valve-disk being formed and to cut it into the required shape in order to enable it to fit its seat. In this view, the step like form of the annular cutting edges is clearly indicated. It is expedient that there should be at least two annular cutting edges, one within the other, in order that the spheroidity or convexity of the valve face may be secured. A certain degree of efficiency may also be attained by having only one annular cutting edge, or by causing the valve-disk to rotate on the end of a bent shank, the steel cup with its cutting edge being fixed.

The amount of surface on the valve-disk traversed by the annular cutting edges in the steel cup varies according to the angle at which the face of the cutter is set with respect to the axis of motion of the tool which will vary with the amount of bending given to the shank A. If the bending is slight, it is obvious that the swirling or rocking motion given to the cutting edges in the steel cup is also slight, and also that the swirling motion and the surface traversed by the cutting edges varies with the angle at which the cutter is set, or, in other words, increases as the bending of the shank increases.

The proper tool, with its face at the proper angle or having the appropriate bend in its shank, may be selected for the particular class of work required.

What I claim as my invention is—

1. A rotary valve facing tool, comprising a support and a steel cup at the end thereof provided with an annular cutting edge having its face set diagonally to the axis of motion of said support, substantially as described.

2. A rotary valve facing tool having a bent shank carrying annular cutting edges at one end and its other end having its surface diagonal to the face of the cutter and adapted to be held in a rotary tool, whereby the face of the cutter derives a swirling motion as the shank rotates, substantially as described.

3. A rotary valve facing tool comprising a steel cup set diagonally to the axis of motion of said tool, and annular cutting edges formed in said cup, the annular cutting edge nearest to the shank of the tool being formed on a circle of less diameter than that on which the outer cutting edge is formed, and so located with respect to each other as to give the required convexity to the valve disk when the tool is rotated, substantially as described.

4. A valve facing tool comprising the following elements: a shank A, with squared end C, a steel cup B set diagonally to the axis of motion of said tool and having beveled end F, and central or hollowed portion D, the outer annular cutting edge E, with recesses H, formed thereon and the inner circular cutting edge G, with recesses I, also formed thereon, substantially as and for the purpose specified.

Petrolia, March 15, 1894.

TRONSON DRAPER.

In presence of—
S. F. GRIFFITHS,
A. G. SHAUNESSEY.